United States Patent [19]

Musa et al.

[11] Patent Number: 5,710,917

[45] Date of Patent: Jan. 20, 1998

[54] METHOD FOR DERIVING DATA MAPPINGS AND DATA ALIASES

[75] Inventors: Mark Anthony Musa, Chittenden, Vt.; Glenn Carroll Godoy, Tioga, N.Y.

[73] Assignee: International Business Machines Corporation, Armonk, N.Y.

[21] Appl. No.: 471,873

[22] Filed: Jun. 7, 1995

[51] Int. Cl.⁶ .................................................. G06F 17/30
[52] U.S. Cl. .......................... 395/610; 395/602; 395/604; 395/615; 395/617; 395/681
[58] Field of Search ............................... 395/600, 610, 395/602, 604, 615, 617, 681; 364/300

[56] References Cited

U.S. PATENT DOCUMENTS

| | | | |
|---|---|---|---|
| 4,930,071 | 5/1990 | Tou et al. | 364/300 |
| 5,123,103 | 6/1992 | Ohtaki et al. | 395/600 |
| 5,161,225 | 11/1992 | Abraham et al. | 395/600 |
| 5,210,868 | 5/1993 | Shimada et al. | 395/600 |
| 5,341,498 | 8/1994 | Connor et al. | 395/600 |
| 5,369,761 | 11/1994 | Coley et al. | 395/600 |
| 5,392,390 | 2/1995 | Crozier | 395/161 |
| 5,403,639 | 4/1995 | Belsan et al. | 395/600 |
| 5,450,581 | 9/1995 | Bergen et al. | 355/600 |
| 5,455,945 | 10/1995 | VanderDrift | 395/600 |
| 5,475,836 | 12/1995 | Harris et al. | 395/600 |
| 5,491,818 | 2/1996 | Malatesta et al. | 395/600 |
| 5,560,005 | 9/1996 | Hoover et al. | 395/600 |
| 5,574,898 | 11/1996 | Leblang et al. | 395/601 |

OTHER PUBLICATIONS

A. Larner, *Access Independent Query Definition in IBM DL/I*, IBM Technical Disclosure Bulletin, pp. 2894–2900 (Dec. 1989).

*Primary Examiner*—Thomas G. Black
*Assistant Examiner*—Cheryl Lewis
*Attorney, Agent, or Firm*—George E. Clark; Jenkens & Gilchrist; Richard M. Goldman

[57] ABSTRACT

This invention describes a computer application system and method for automatically deriving data mappings by processing stored data mappings. Derived data mappings are system generated data mappings. The system comprises a plurality of stored data mappings, a data mapping report generator, and a data mapping tool. Heretofore, data mappings were created by human analysis of data from two or more sources to determine the relationship between data fields. This time consuming process has been eliminated by the present invention. The derived data mappings may be stored for later use or provided to other system programs. The derivation may be performed at various levels of abstraction. Derived data mappings that should not be used are also identified.

16 Claims, 12 Drawing Sheets

FIG. 12

| APPLICATION SYSTEM | DATA GROUP | DATA FIELD |
|---|---|---|
| CUTCHEX | ACCOUNT | A<br>B<br>C |
| | CHECK | D<br>E<br>F<br>G |
| | BILL | H<br>I<br>J |
| APBILL | Z7ACCT | K<br>L<br>M |
| | Z7XMPO | N<br>O<br>P<br>Q |
| | Z6BCDF | R<br>S<br>T |
| REQUEST | MIRQ001 | U<br>V<br>W |
| | MIRQ002 | X<br>Y<br>Z |
| BILLA | INVOICE | AA<br>BB<br>CC |

METHOD FOR DERIVING DATA MAPPINGS AND DATA ALIASES

DESCRIPTION

1. Field of the Invention

This invention relates to a computer application system for automatically deriving data mappings, and more particularly, to a design tool that assists in the efficient migration of data from one storage format to another.

2. Background Art

Systems integration is commercially important and one of the largest segments of today's information systems arena. Systems integration can include a variety of problems. A systems integration effort is needed every time a new computer application is installed in an environment where other computer applications reside.

The need for data migration can arise in a variety of contexts. For example, a vendor of a software application program may come out with a new version of the application program which uses different formats for data storage. In such a situation a user would prefer to retain as much preexisting information as possible and to incorporate all of the preexisting information into the new version of the application program. Data migration is also required when a user changes from an application program made by one vendor to an application program made by another vendor. Since each vendor usually stores the base data in different formats in different files, one would need to convert the data stored in an old database into the format used by the new application program. Data migration is also required when users replace an entire computing environment. Changes in hardware almost always require the conversion of data to newer formats.

Data migration can also be user driven. A corporation might reorganize its internal information system to incorporate newer production management techniques. This would naturally require that data stored in prior formats be incorporated into the formats required by a newer information management system. Data migration may also be required by changes in prevailing business standards or regulations. Examples of this could be the change in the postal zip code from five digits to nine digits or in the introduction or change in state or local tax rates.

One of the aspects of system integration is data migration, also known as data conversion and/or data bridging. These data intensive tasks of system integration are often time consuming and often, the most expensive part of systems integration. A variety of companies and products exist that address the various aspects of data migration. It is important to devise tools that automate more of the subtasks involved in data migration. By finding ways of performing these tasks more quickly and efficiently, one can save substantial amounts of time and money.

Most data intensive tasks in data migration lie in understanding the scope of the data, mapping source data to target data, writing computer programs to move or translate the data and in actually effecting the movement of data either one time or repetitively. Hithertofore, companies have not systematized the data migration process. Thus, every data migration effort has been treated as a one-time effort. Much of the effort spent in analyzing and understanding the structure of an older data format is often forgotten or lost after the transfer of the data is effectuated. While the mapping of the storage formats of data in the data base is often retained within some computer systems, one area that has not been addressed until now is the reuse of data mappings as a means of deriving or generating new mappings. Much effort is spent by companies to map source data to target data, but once that particular program is completed, the mapping is not used again. It would present a great advantage, if the effort spent on previous data mappings could be reused to generate new data mappings on related or unrelated systems integration tasks.

SUMMARY OF THE INVENTION

It is therefore an object of this invention for a user to be able to reuse prior data mappings to generate newer data mappings, without having to have personal knowledge of prior data mapping efforts. It is a further object of this invention to construct a data directory containing aliases for the same substantive information stored in different files across different application programs or on the same application program over a varying period of time. It is a further object of this invention to generate derived maps that may be used as an input to a report generation tool, data mapping tool or code generation tool. It is a further object of this invention to increase the efficiency of the data migration process and to reduce the errors and wasted effort in the data migration process. The system and method of this invention comprises a repository of stored data mappings from prior data mapping efforts, a data mapping report generator and a data mapping tool. The data mapping tool generates derived data maps using the stored data mappings from prior data migration efforts.

Given a list of prior data maps, the system of the present invention constructs a series of derived data maps by forward chaining the original data maps and by reverse chaining the reverse data maps. Reverse data maps are created by transposing the source and target segments of a prior data map. Derived data maps may also be added to the repository of stored data mappings. The system is capable of processing the full set of stored data mappings or only analyzing a limited subset of the existing mappings.

BRIEF DESCRIPTION OF THE DRAWINGS

More complete understanding of the method and apparatus of the present invention may be had by a reference to the detailed description following, taken in conjunction with the accompanying drawings wherein:

FIG. 12 shows an exemplary map derivation problem.

DESCRIPTION OF THE PREFERRED EMBODIMENT

Figure 1:
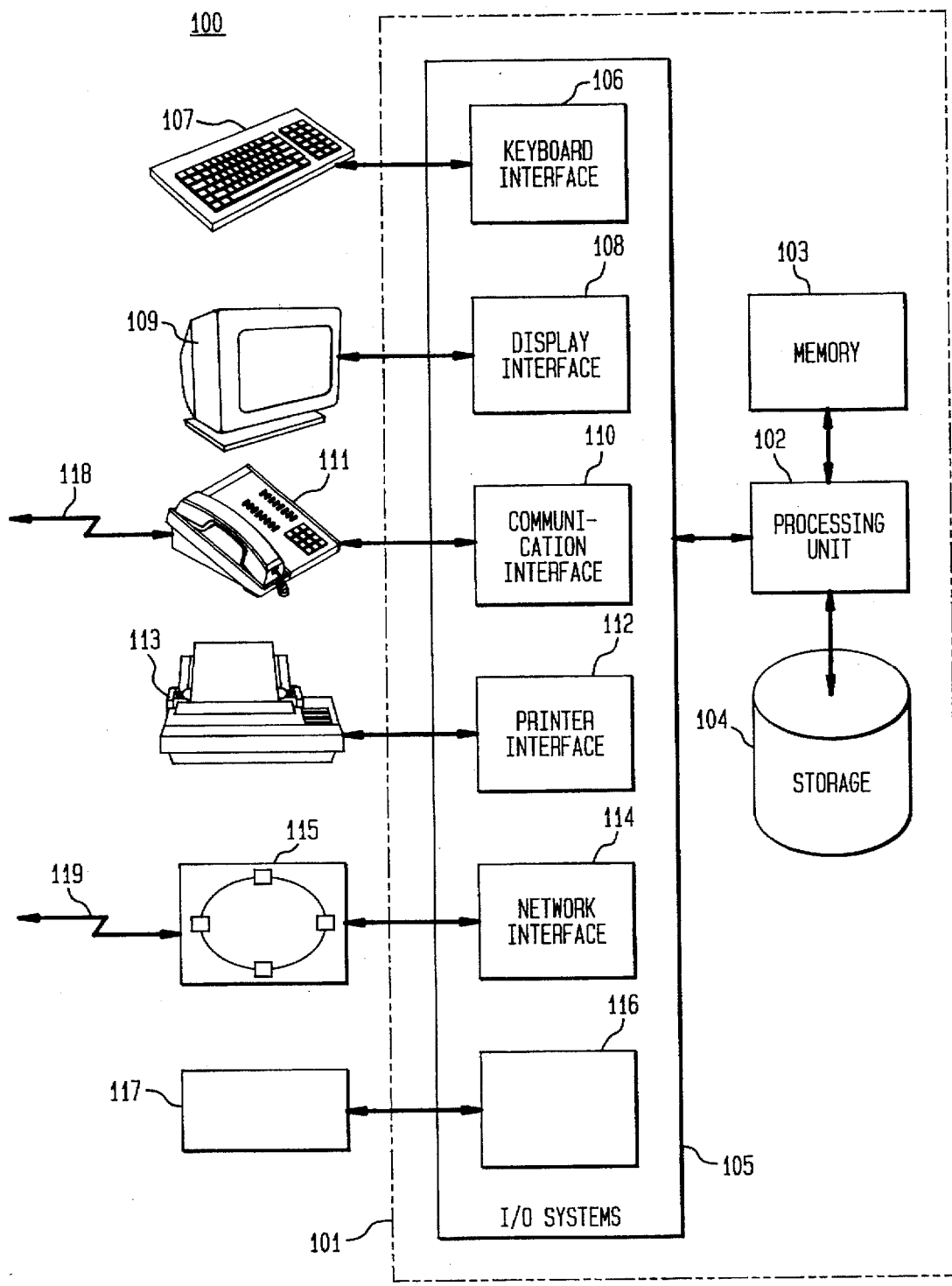
FIG. 1 shows a computing system.

As shown in FIG. 1, a computing system 101 comprises of a processing unit 102 connected to a memory 103, storage 104 and input/output systems 105. The processing unit 102 may further be comprised of one or more processors, not shown in the figure. The input/output systems 105 are further comprised of one or more keyboard interfaces 106 connected to various keyboards 117; one or more display interfaces 108, connected to display monitors 109; one or more communication interfaces 110, connected to communications devices 111; one or more printer interfaces 112 connected to printers 113; one or more network interfaces 114 connected to one or more networks 115 and other interfaces 116 connected to other input/output devices 107. It should be noted that the system shown in FIG. 1 is purely illustrative and the operation of the invention described below will not be limited by the absence of any of the components shown or by the presence of other components not shown in the figure.

Figure 2:
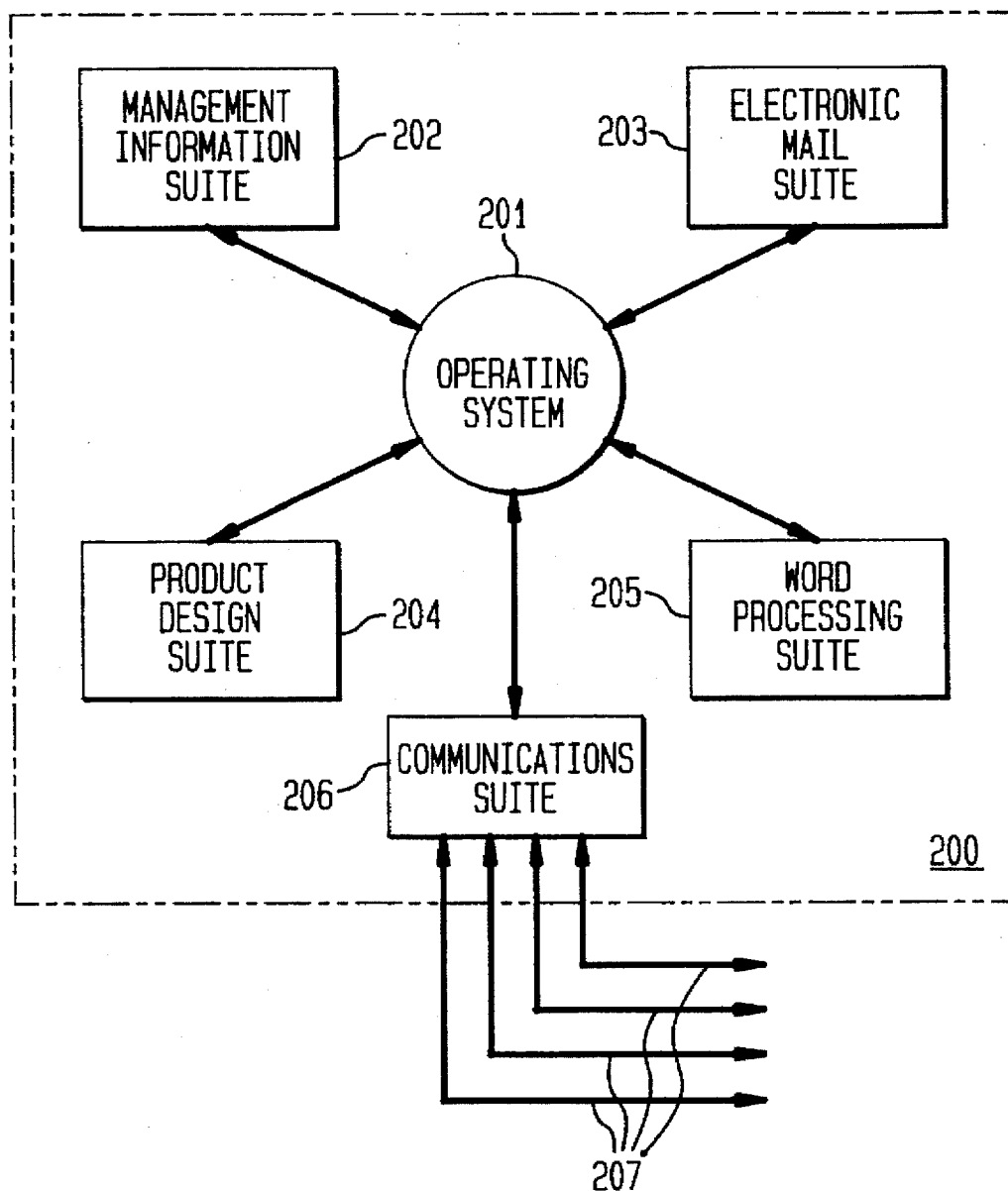
FIG. 2 shows the typical software components of a computing system.

In addition to the hardware elements of the computing system shown in FIG. 1, a computing system also is comprised of multiple software units as shown in FIG. 2. Thus, the software contained within a computing system is usually comprised of an operating system 201 that interacts with multiple application program suites. Examples of such application programs include a Management Information Suite 202, an Electronic Mail Suite 203, a Product Design Suite 204, a Word Processing Suite 205 and a Communications Suite 206. The Communications Suite 206 permits the computer system to communicate with other hardware and input/output elements via communications links 207. Each of the application program suites communicates with other application program suites and external input/output devices through the operating system 201.

Figure 3:
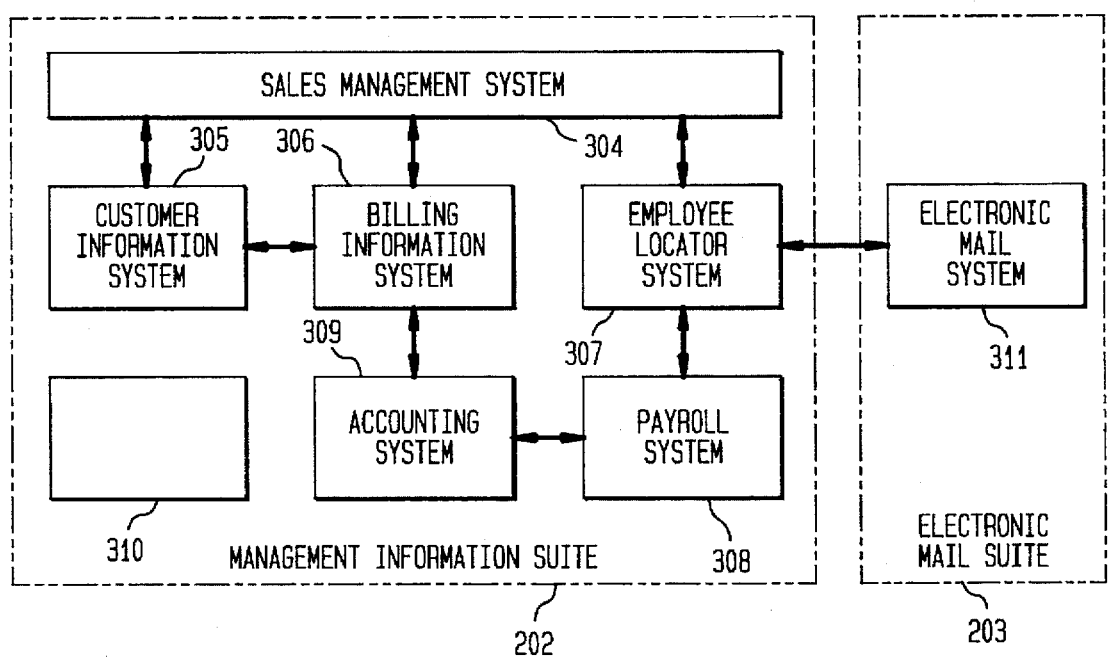
FIG. 3 exemplifies the typical systems within an application program suite.

Two of the application program suites shown in FIG. 2 are shown in greater detail in FIG. 3. Thus the Management Information Suite 202 may further be comprised of Sales Management System 304, a Customer Information System 305, a Billing Information System 306, an Employee Locator System 307, a Payroll System 308, an Accounting System 309 and other systems 310, not shown. Likewise, the Electronic Mail Suite 203 is comprised of an Electronic Mail System 311 and other systems not shown.

The various systems within an applications suite interact with each other and sometimes, with systems in other applications suites. Thus, for example, the Sales Management System 304 is likely to have interaction with the Customer Information System 305 because all sales naturally involve customers. Likewise the Sales Management System may also interact with the Billing Information System 306 and, for companies that track sales by employee, the Sales Management System 304 will also interact with the Employee Locator System 307. The Payroll System 308 may likewise interact with the employee information stored in the Employee Locator System 307 and with the Accounting System 309, because an accounting system is usually responsible for the generation of checks.

The Accounting System 309 may also be linked to the Billing Information System 306 to track the payment history of various customers in conjunction with the Customer Information System 305. Systems may also interact across application suite boundaries. Thus, the Electronic Mail System 311 may need to get the electronic mail addresses of various employees when a user seeks to send electronic mail to another employee.

Figure 4:
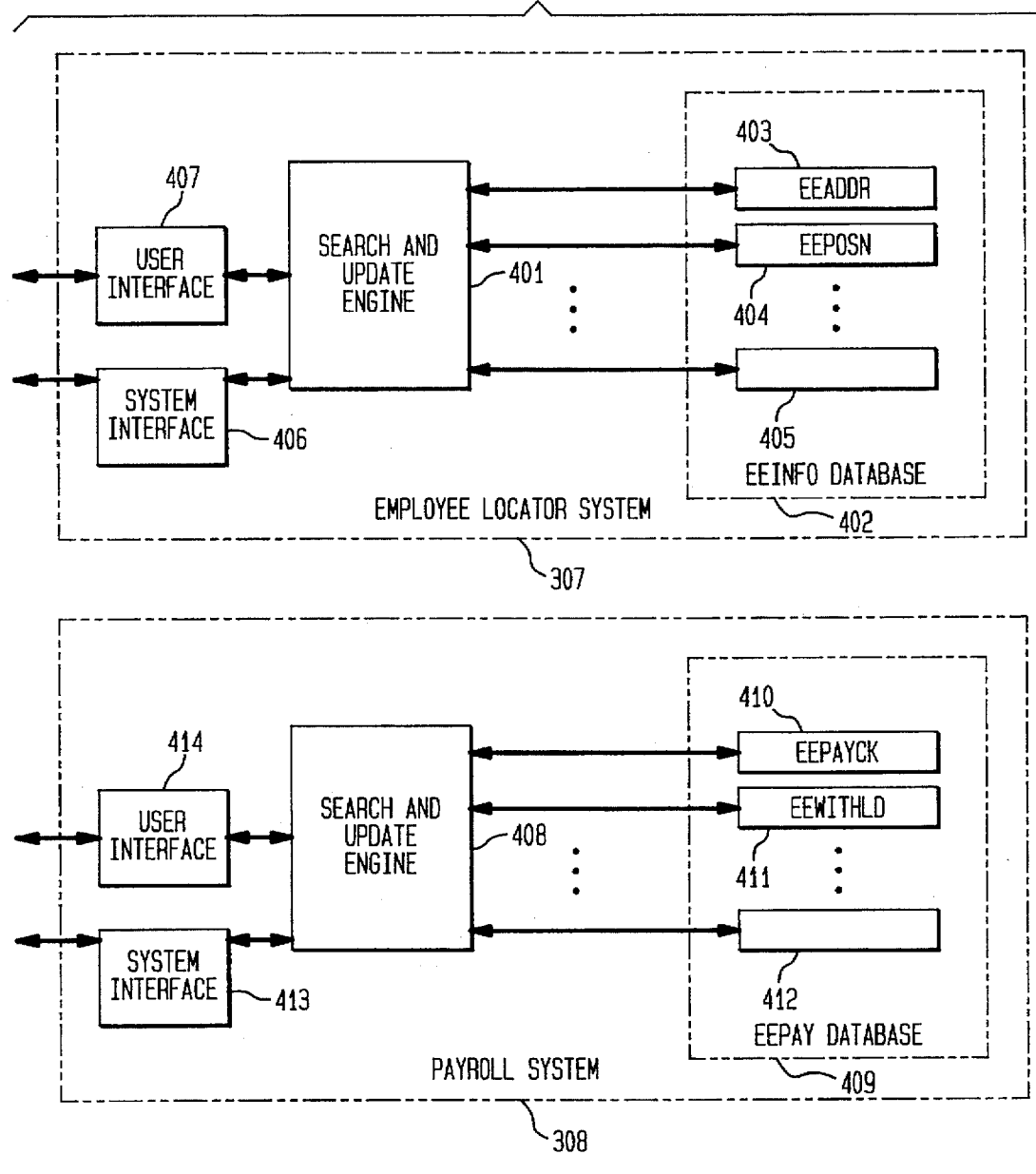
FIG. 4 details the internal structure of two systems within an application program suite.

The Employee Locator System 307 and the Payroll System 308 are shown in greater detail in FIG. 4. The Employee Locator System 307 is comprised of a search and update engine 401 connected to a EEINFO database 402. The EEINFO database 402 is further comprised of a plurality of files, such as an employee address file, EEADDR 403, an employee organizational position list, EEPOSN 404, and other files 405, not shown. The search and update engine 401 typically consists of hardware and software elements within the computer system that permit the efficient storage and retrieval of information stored in the EEINFO database 402. The search and update engine 401 further communicates both with users and with the operating system and with other systems and applications suites via system interface 406 and user interface 407.

Likewise, Payroll System 308 is comprised of a similar search and update engine 408, linked to an employee payroll database, EEPAY 409. The EEPAY database 409 is further comprised of multiple files such as an employee paycheck information file, EEPAYCK 410, and an employee tax withholding data file, EEWITHLD 411, and other files 412, no shown. The search and update engine 408 of Payroll System 308 also communicates with users and with other software units through system interface 413 and user interface 414.

Figure 5:
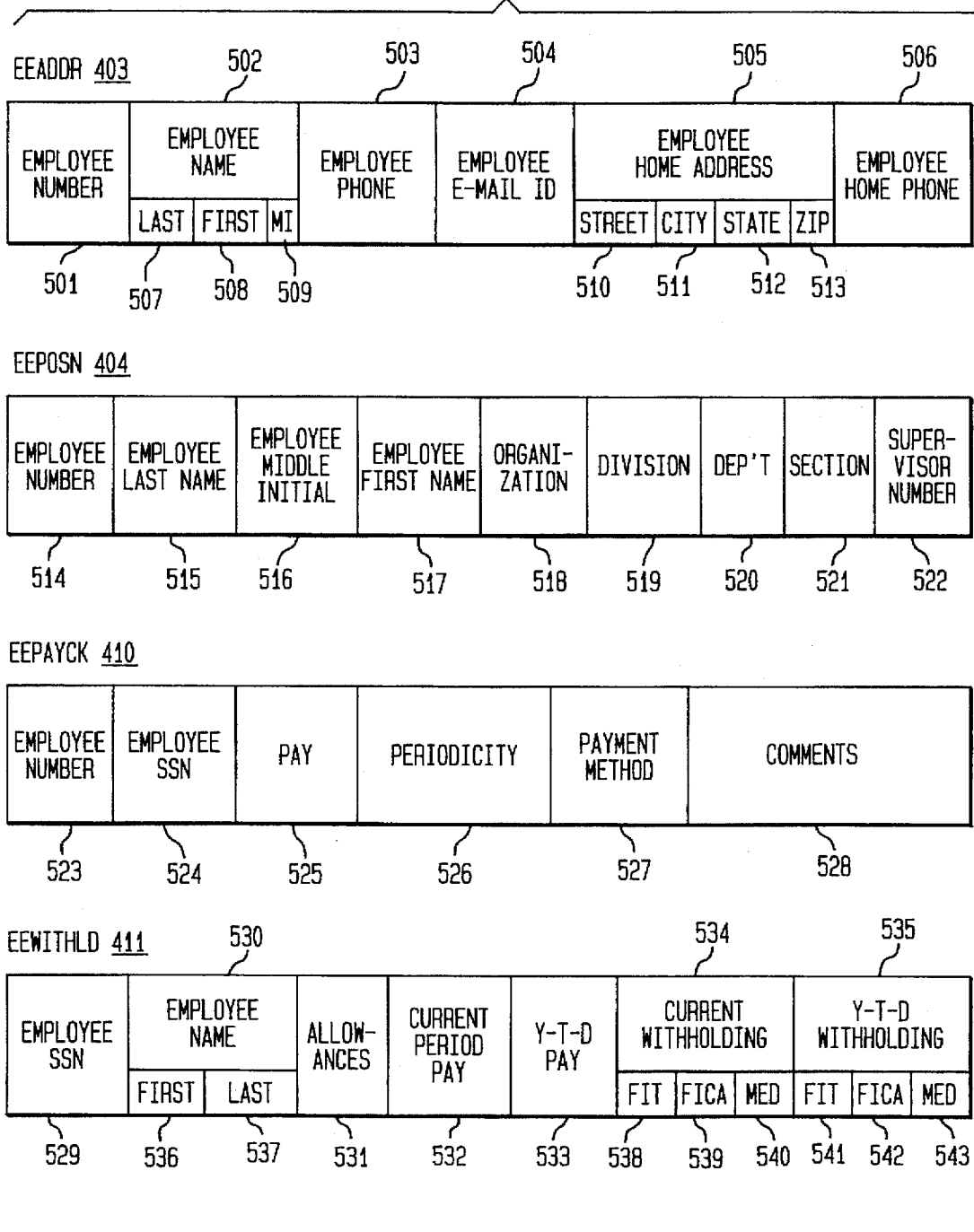
FIG. 5 shows the storage format of files in databases associated with a system within an application suite.

FIG. 5 shows the storage format of files EEADDR 403, EEPOSN 404, EEPAYCK 410, and EEWITHLD 411. Each of the files in the databases shown is further comprised of a multiplicity of data fields, some of which are grouped into a data group. Thus, file EEADDR 403 consists of an employee number field 501, an employee name data group 502, an employee phone field 503, an employee electronic mail address field 504, an employee home address data group 505 and an employee home phone number field 506. The employer name data group 502 is further comprised of a last name field 507, a first name field 508 and a middle initial field 509. The employee home address data group 505 further comprises of a street address field 510, a city field 511, a state field 512, and a zip code field 513. The employees organization position data file EEPOSN 404 also is comprised of multiple fields 514 through 522.

The information contained in each of the fields 514 through 522 is shown in FIG. 5. It is worth noting that the employee last name field 515, the employee middle initial field 516 and the employee first name field 517 contain similar or identical information to fields 507 through 509 of the EEADDR file 403. However, although the fields contain like information, it is not unusual in an operational context for information contained in some files to be more current than those contained in other files within the same management information system. Fields 523 through 528 of the employee paycheck generation file EEPAYCK 410 and fields 529 through 535 of the employee withholding data file EEWITHLD 411 are also shown in FIG. 5.

Each data field may contain alphabetic information such as names or numeric information such as social security numbers or mixed information such as street addresses. Further, some fields contain only upper case characters such as the employee middle initial field while other fields may contain decimal numeric information such as the federal income tax withholding fields 538 and 541. Fields may also have varying lengths. The details of the various data fields and data groups in the four files shown in FIG. 5 are listed in Table 1A and 1B below:

TABLE 1A

STORED MAPPING DATA FOR THE EXAMPLE IN FIG. 5

| File Name | Date Group Name | Data Field Name | Data Type | Length | Description |
|---|---|---|---|---|---|
| EEADDR | | EENUM | NUMERIC | 6 | Employee Number |
| | EENAM | EENAML | ALPHA | 10 | Employee Last Name |
| | | EENAMF | ALPHA | 8 | Employee First Name |
| | | EENAMM | ALPHA | 1 | Employee Middle Initial |
| | | EEPHON | NUMERIC | 5 | Employee Telephone |
| | | EEEML | ALPHANUM | 20 | Employee E-Mail ID |
| | EEHOM | EEHOMR | ALPHANUM | 25 | Employee Home Street |
| | | EEHOMC | ALPHA | 15 | Employee Home City |
| | | EEHOMA | ALPHA | 2 | Employee Home State |
| | | EEHOMZ | NUMERIC | 5 | Employee Home Zip |
| | | EETEL | NUMERIC | 10 | Employee Home Telephone |
| EEPOSN | | EENUMB | NUMERIC | 7 | Employee Number |
| | | EELNAM | ALPHA | 15 | Employee Last Name |
| | | EEMIDD | UC ALPHA | 1 | Employee Middle Initial |
| | | EEFNAM | ALPHA | 8 | Employee First Name |
| | | EEORGN | NUMERIC | 2 | Organization Code |
| | | EEDIVN | NUMERIC | 3 | Division Code |
| | | EEDEPT | NUMERIC | 2 | Department Code |
| | | EESECT | NUMERIC | 1 | Section Code |
| | | EESUPR | NUMERIC | 7 | Supervisor's Number |

TABLE 1B

STORED MAPPING DATA FOR THE EXAMPLE IN FIG. 5

| File Name | Date Group Name | Data Field Name | Data Type | Length | Description |
|---|---|---|---|---|---|
| EEPAYCK | | EENUMR | NUMERIC | 7 | Employee Number |
| | | EESSN | NUMERIC | 9 | Social Security Number |
| | | EEPAY | DECIMAL | 9 | $DDDDDDD.CC |
| | | EEPERD | NUMERIC | 1 | How Often Paid |
| | | EEPAYM | ALPHA | 1 | Check or Direct Deposit |
| | | EEPCMT | ALPHANUM | 200 | Space for Comments |
| EEWITHLD | | SOCSECNO | NUMERIC | 9 | Social Security Number |
| | EENAME | EEFIRN | ALPHA | 10 | Employee First Name |
| | | EELASN | ALPHA | 20 | Employee Last Name |
| | | ALLOW | NUMERIC | 2 | Withholding Allowances |
| | | CURPAY | NUMERIC | 7 | Current Period Pay |
| | | YTDPAY | NUMERIC | 8 | Year to Date Pay |
| | CURWITH | CURFIT | DECIMAL | 7 | Current FIT Withheld |
| | | CURFICA | DECIMAL | 7 | Current FICA Withheld |
| | | CURMED | DECIMAL | 7 | Current MED Withheld |
| | YTDWITH | YTDFIT | DECIMAL | 8 | Cumulative FIT Withheld |
| | | YTDFICA | DECIMAL | 8 | Cumulative FICA Withheld |
| | | YTDMED | DECIMAL | 8 | Cumulative MED Withheld |

It often becomes necessary to move data from one database to another or to one set of files within a single database to a different set of files. Such changes can be necessitated in several common circumstances. For example, a corporation might restructure its internal organization in such a way that employees are no longer classified by organization, division, department and section, but only by using the organization, division and department categories. Another similar situation would be when changes in the U.S. Postal Service classification system might require that five digit zip codes be converted to nine digit zip codes. Further, growth in the size of the organization may require that the field width of the employee identification number be increased in size.

Yet another example might be changes in federal, state and local tax regimes requiring that state and local taxes be withheld where only federal taxes had earlier been withheld. Changes in technology might require that the employee directory also contain the facsimile and beeper numbers of employees. In yet a different circumstance, some systems within an applications suite may store the same data as other systems but the data stored within the two systems may not be identical because of failure to update one of the databases. Changes in storage format may also be necessitated by changes in the computation algorithm used by the search and update engine or by a requesting system. Changes in storage format may also come about due to upgradation of a system within an application suite, or of an entire applications suite or of the entire computing environment itself.

Figure 6:
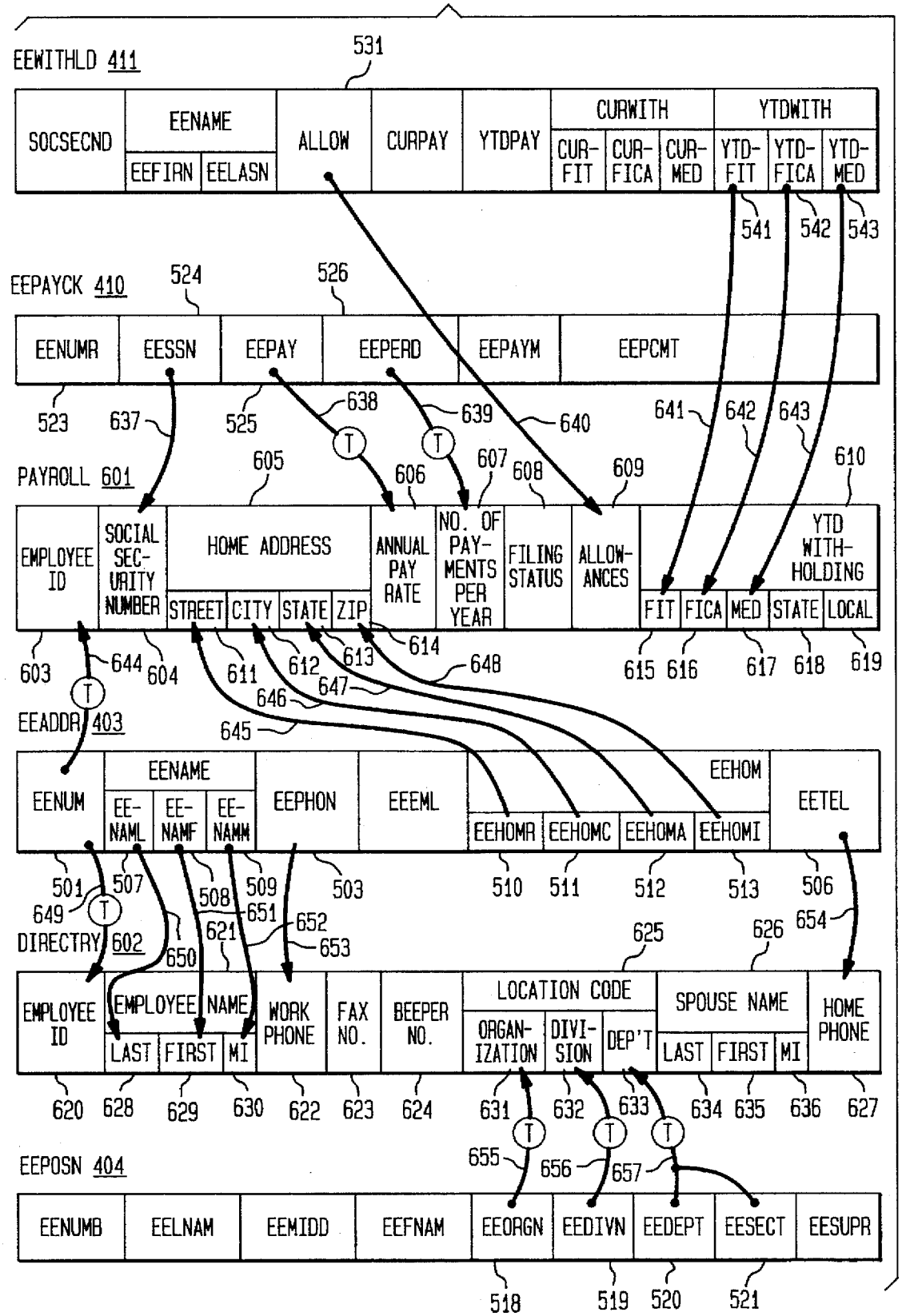
FIG. 6 illustrates an exemplary mapping from one storage format to another.

FIG. 6 illustrates an exemplary mapping from one storage format to another. In FIG. 6 some fields from the files EEWITHLD 411, EEPAYCK 410 and EEADDR 403 are mapped to a new field PAYROLL 601. Likewise some fields from the files EEADDR 403 and EEPOSN 404 are mapped to a new file DIRECTRY 602. Thus, the new file PAYROLL 601 comprises an employee identification number field 603, a social security number field 604, a home address data group 605, an annual pay rate field 606, number of payments per year field 607, a filing status field 608, an allowances field 609 and a year-to-date withholding data group 610.

The home address data group 605 is further comprised of a street address field 611, a city name field 612, a state name field 613 and a nine digit zip code field 614. The year-to-date withholding field 610 is further comprised of a federal income tax withholding field 615, a FICA withholding field 616, a medicare withholding field 617, a state tax withholding field 618, and a local tax withholding tax field 619.

The mapping of the data in files EEWITHLD 411, EEPAYCK 410 and EEADDR 403 to PAYROLL 601 is shown by the directional arrows 637 through 648. Some of these directional arrows carry the letter "T" on them denoting that the process of mapping involves translation from one code to another. For example, the EEPAY field 525 is mapped to the annual pay rate field 606 by the mapping relationship 638. This may, for example, result from the use of different bases in the payroll information database. The EEPAY field 525 contained a value corresponding to the pay received by an employee in one pay period whereas the Annual Pay Rate field 606 contains the annual compensation of the employee.

The mapping 639 of the EEPERD 526 to the Number of Payments Per Year 607 provides another example of when a translation may be required to map the data from an old storage format to another. The EEPERD 526 may have stored the data in the form of alphabetic code such as 'M' for monthly, 'S' for semi-monthly, 'B' for biweekly, 'W' for weekly, etc. In contrast, the Number of Payments Per Year field 607 may contain a numeric value indicating the number of pay periods per year.

Another kind of translation is illustrated by mapping relationship 644 which maps the EENUM field 501 of file EEADDR 403 to the Employee ID field 603 of PAYROLL file 601. Such a translation may result from an increase in the size of the firm or a conversion of one employee number to a different employee number due to the acquisition of an organizational group.

Sometimes data fields are also concatenated in addition to being translated. This is shown, for example, by mapping relationship 657 which maps the EEDEPT field 520 and EESECT field 521 of EEPOSN file 404 to the department location code 633 of the DIRECTRY file 602.

FIG. 6 also shows mapping relationships 649 through 657 detailing the relationship between the old files EEADDR 403 and EEPOSN file 404 and the new DIRECTRY file 602. As shown in FIG. 6 the DIRECTRY file 602 is comprised of multiple data fields 620, 622, 623, 624 and 627 and data groups 621, 625 and 626 which are further comprised of data fields 628 through 636.

As can be seen from the above example, even a simple data mapping from four old files to two new files is a very complex task and consequently very tedious and somewhat error prone. The task is further complicated by the fact that multiple files may contain the same or similar information in different fields and sometimes in different internal representation formats.

Figure 7:
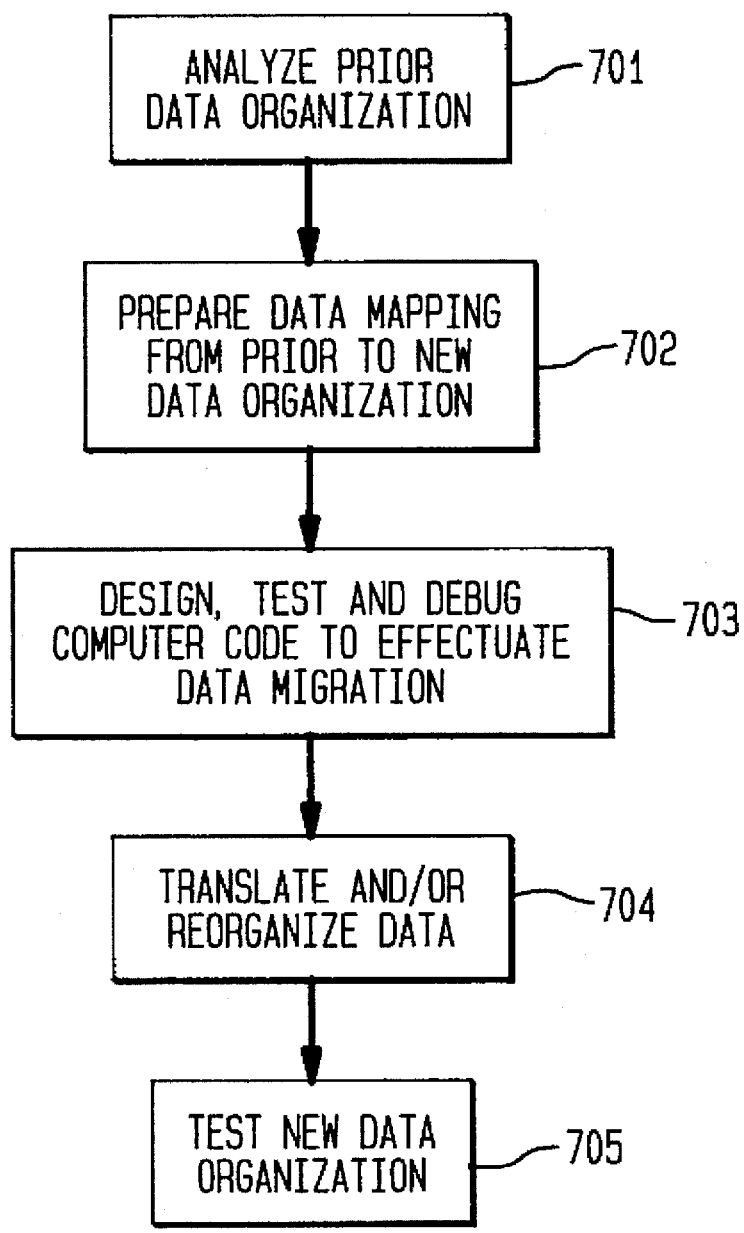
FIG. 7 shows the various high-level steps involved in migrating data from one storage format to another.

FIG. 7 shows the various high-level steps involved in migrating data from one storage format to another. The process starts with the analysis of the prior data organization as shown in step 701. This is followed by the data map that identifies the application system, the data group and the data field of the prior data storage format and relates it to the new data organization to be created, as shown by step 702. The next step after the preparation of the data map is the design construction, testing and debugging of computer programming instructions to effectuate the data migration. This is shown by step 703 of FIG. 7. After the computer code has been debugged and tested, it is used to translate and reorganize the data into the desired new storage format as shown by step 704. Finally, the new data organization is tested to make sure that it satisfies the design objectives. This is shown in step 705 of FIG. 7.

Figure 8:
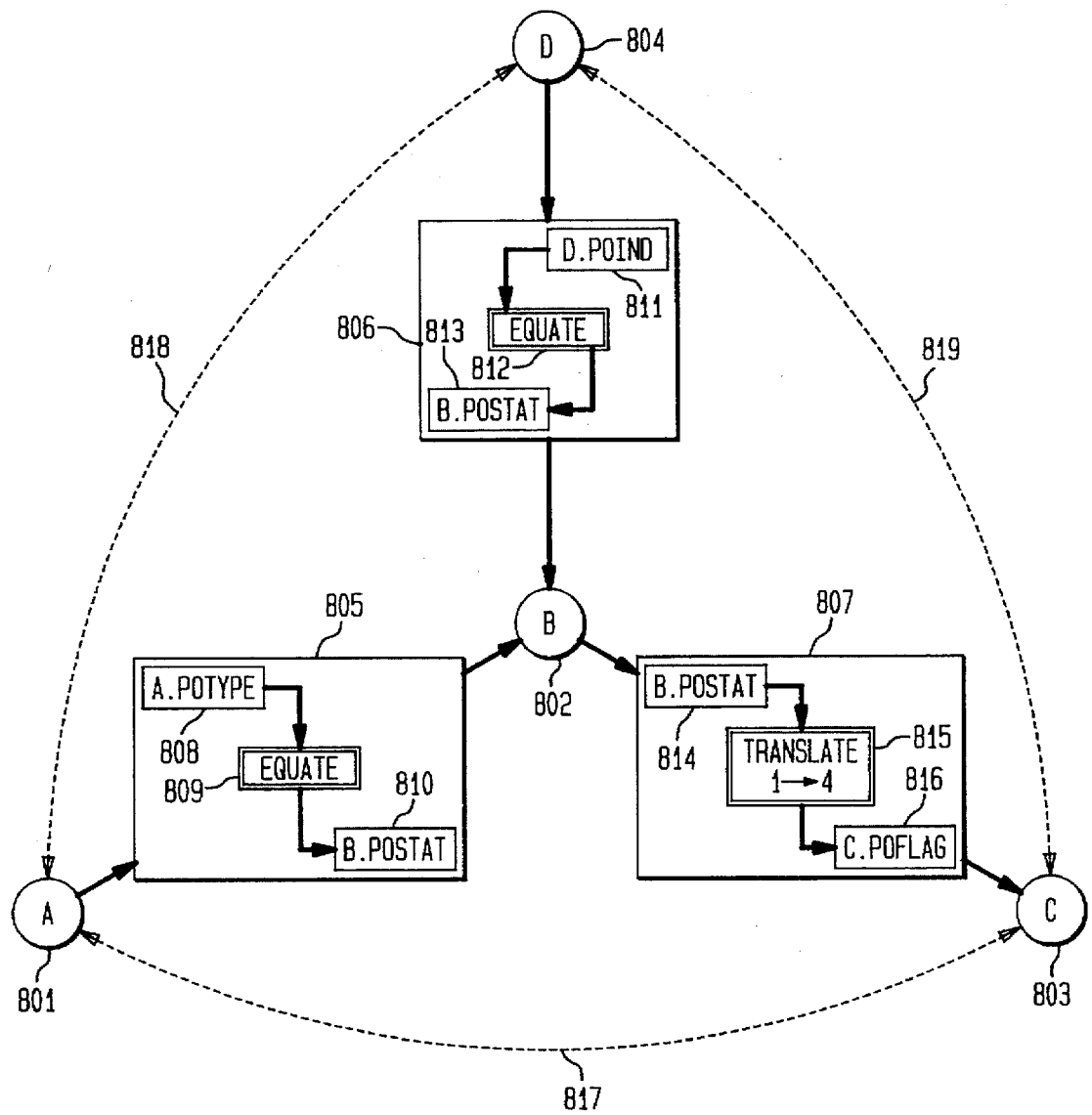
FIG. 8 illustrates the relationship between stored data mappings and automatically derivable data mappings.

As can be seen from FIG. 6, the data mapping process is an inherently complex one. Further, data mapping may be done on various data bases within a computer system at differing times. While the maps of the data stored within various databases is usually retained within the computer system, prior systems have not attempted to reuse stored data maps to automatically derive newer data maps. An example illustrating the derivation of new data maps from prior data maps is illustrated in FIG. 8. If a prior data mapping effort had equated to the field POTYPE in file A to the field POSTAT in file B, and on a different occasion, the field POSTAT in file B had been translated to the field POFLAG in file C, and field POIND in file D had been equated the field POSTAT in file B, the three different mappings can be depicted as shown in FIG. 8.

The mapping of file A 801 to file B 802, file B 802 to file C 803, and file D 804 to file B 802 is shown by mapping relationships 805, 806 and 807, respectively. As can be seen in FIG. 8, mapping relationship 805 essentially uses an identity algorithm as shown by the algorithm box 809. Likewise, the mapping relationship 806 essentially consists of an identity algorithm 812. However, the mapping relationship 807 consists of a translation algorithm 815. In the example illustrated, if the value of the POSTAT field is one in file B, it is translated to a POFLAG value of four in file C. Prior data mapping techniques have required that any new data mapping, even if between the same fields of the same files, would have required the manual creation of new data maps.

However, as illustrated in FIG. 8, one can automatically derive a mapping relationship 817 to translate the POTYPE field of file A to the POFLAG of file C. This automatically derivable mapping relationship is shown by the broken double-sided arrow line 817. Similarly, the mapping relationships between the POTYPE field of file A and the POIND field of file D is also automatically derivable as shown by the broken double-sided arrow 818. In a similar manner, the relationship between POIND field of file D and the POFLAG field of file C is also automatically derivable as shown by the broken double-sided arrow 819. It is to be noted that the derivation of a mapping relationship can be bi-directional unless one of the mappings involved concatenation or combination of data fields or elements in a manner that makes it impossible to undue the transformation.

Figure 9:
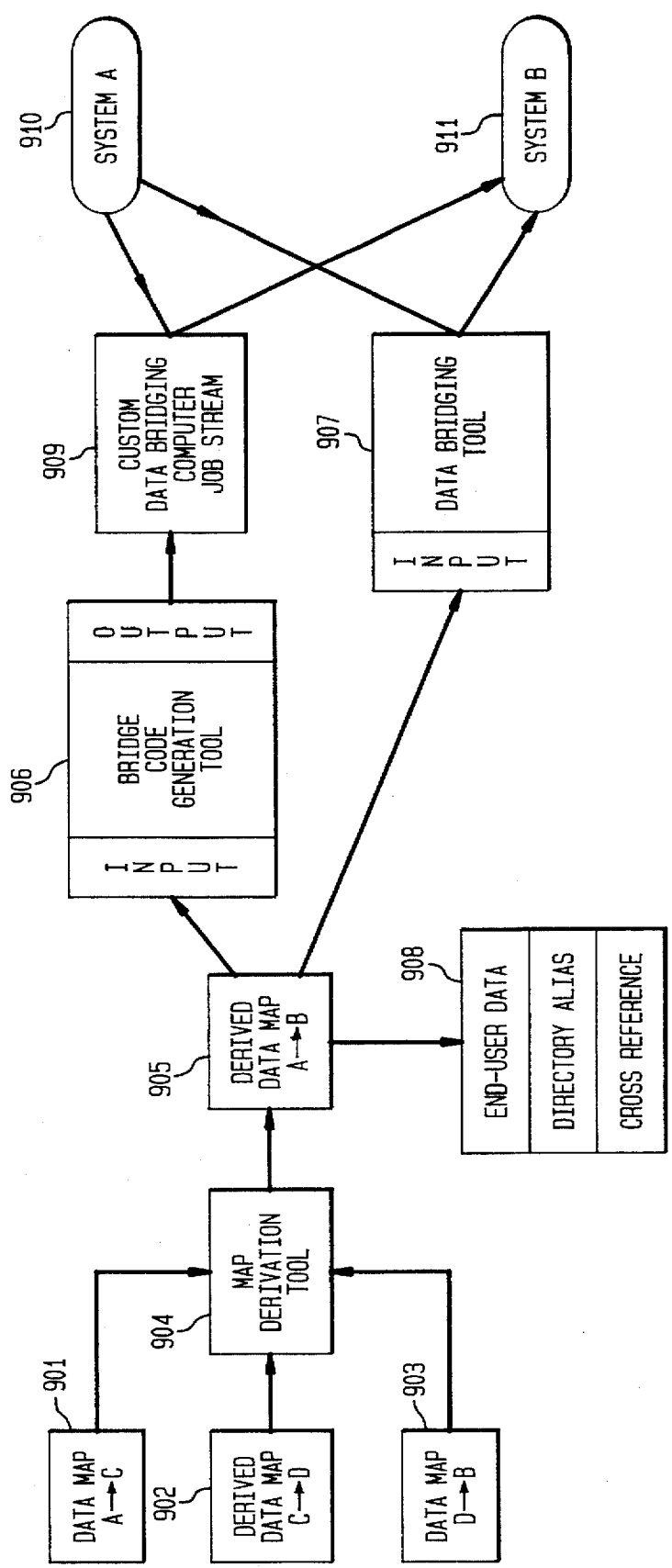
FIG. 9 shows some illustrative uses of data map derivation.

Some illustrative uses of data map derivation are shown in FIG. 9. A map derivation tool 904 takes as its input prior data maps 901, 902 and 903 and derives a new data map 905. In the example illustrated, box 901 shows a pre-existing data map from file A to file C and box 903 shows a pre-existing data map from file D to file B. The map derivation tool 904 is also capable of accepting an earlier derived data map such as the one illustrated from file C to file D in box 902. The map derivation tool 904 can derive a data map from file A to file B as shown in box 905.

The derived data map can serve several uses as shown in FIG. 9. The derived data map can be an input to a bridge code generating tool 906. Such a bridge code generation tool creates specific computer programming instructions to bridge data from System A 910 to System B 911. The derived data map may also be used as an input to standardized data bridging tool 907 which can also accomplish the task of bridging data from System A 910 to System B 911. Derived data maps may also be fed into a report generator for the use of end users. The maps may also be used to create data aliases and to cross reference various data fields, as shown in box 908.

The present invention also automatically derives data aliases. Data aliases are data maps that identify differing fields as containing the same substantive information. Thus, in the example shown in FIG. 8, the POTYPE field of file A is an alias for field POSTAT in file B, the field POFLAG in file C and the field POIND in file D. Table 2 shows the data alaises for each of the four data field names used in the example accompanying FIG. 8.

TABLE 2

| DATA ALIASES | |
|---|---|
| DATA FIELD | DATA ALIASES |
| A. POTYPE | B. POSTAT, C. POFLAG, D. POIND |
| B. POSTAT | A. POTYPE, C. POFLAG, D. POIND |
| C. POFLAG | A. POTYPE, B. POSTAT, D. POIND |
| D. POIND | A. POTYPE, B. POSTAT, C. POFLAG |

Figure 10:
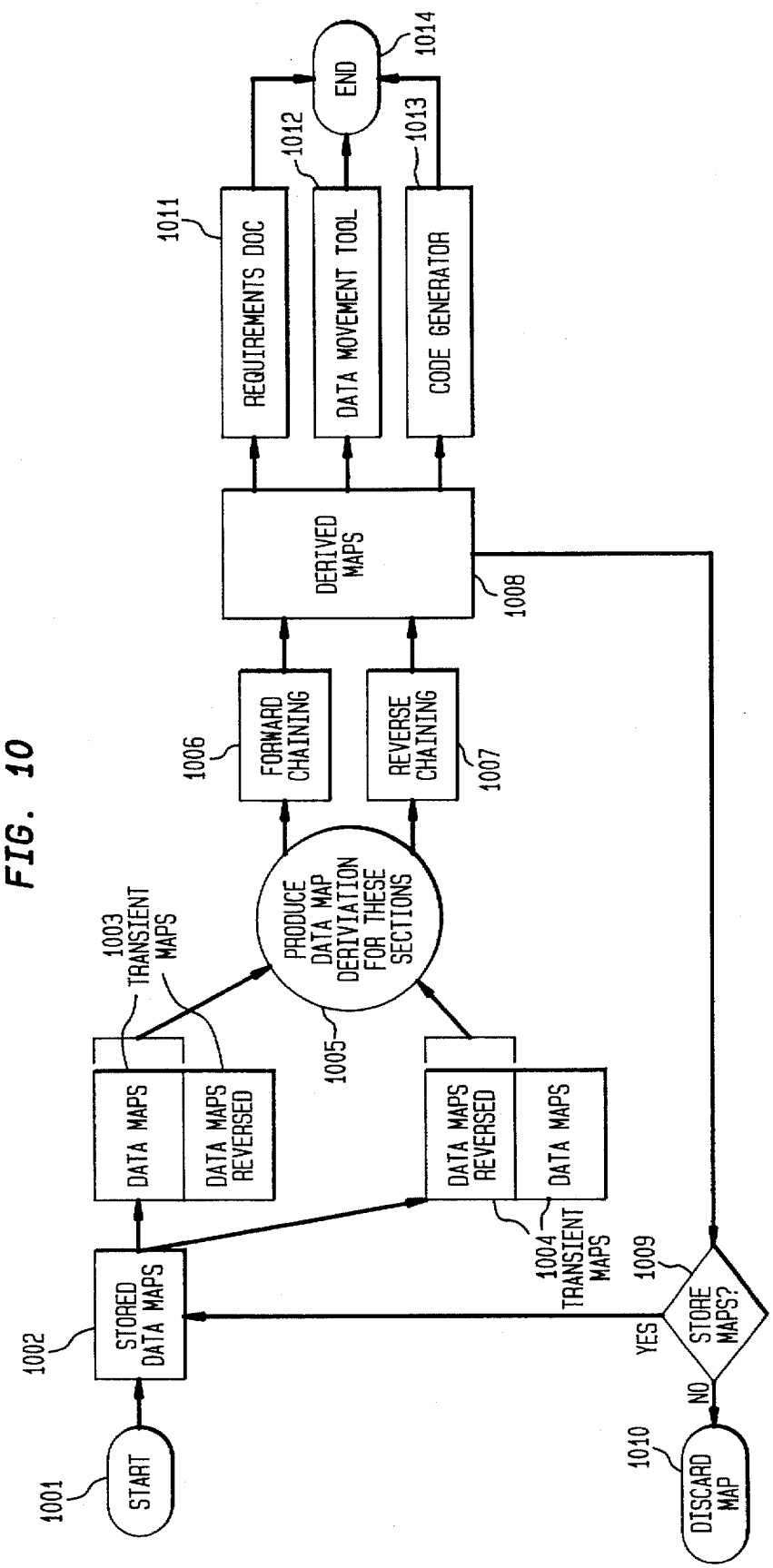
FIG. 10 provides a high-level overview of the map derivation process.

A high level description of the processing of deriving data maps from other stored data maps is illustrated in FIG. 10. The process starts as shown by circle 1001 by taking data maps stored within the computer system as shown in box 1002 and generating two sets of transient maps 1003 and 1004. Transient maps 1003 consists of the original data maps concatenated with the reversed data maps. Transient maps 1004 consists of the reversed data maps concatenated with the original data maps. Transient maps 1003 and 1004 are fed into a map derivation tool 1005 that generates derived maps by forward chaining of transient map 1003 and reverse chaining of transient maps 1004 as shown in boxes 1006 and 1007, respectively.

The derived maps generated by the map derivation tool can then be stored with the pre-existing stored maps 1002. If storage of the derived data maps is not desired, the derived maps are discarded as shown in circle 1010. The derived maps generated by this process can be used as inputs to a requirements document generator 1011 or a data movement tool 1012 or to a code generator 1013. After one or more of these applications terminates, the process ends as shown by circle 1014.

It should be noted that the map derivation tool 1006 performs the forward chaining only on the original data maps of the transient map set 1003. Likewise, the map generation tool 1005 performs the reverse chaining procedure 1007 only on the reversed data maps of the transient maps set 1004.

Figure 11:
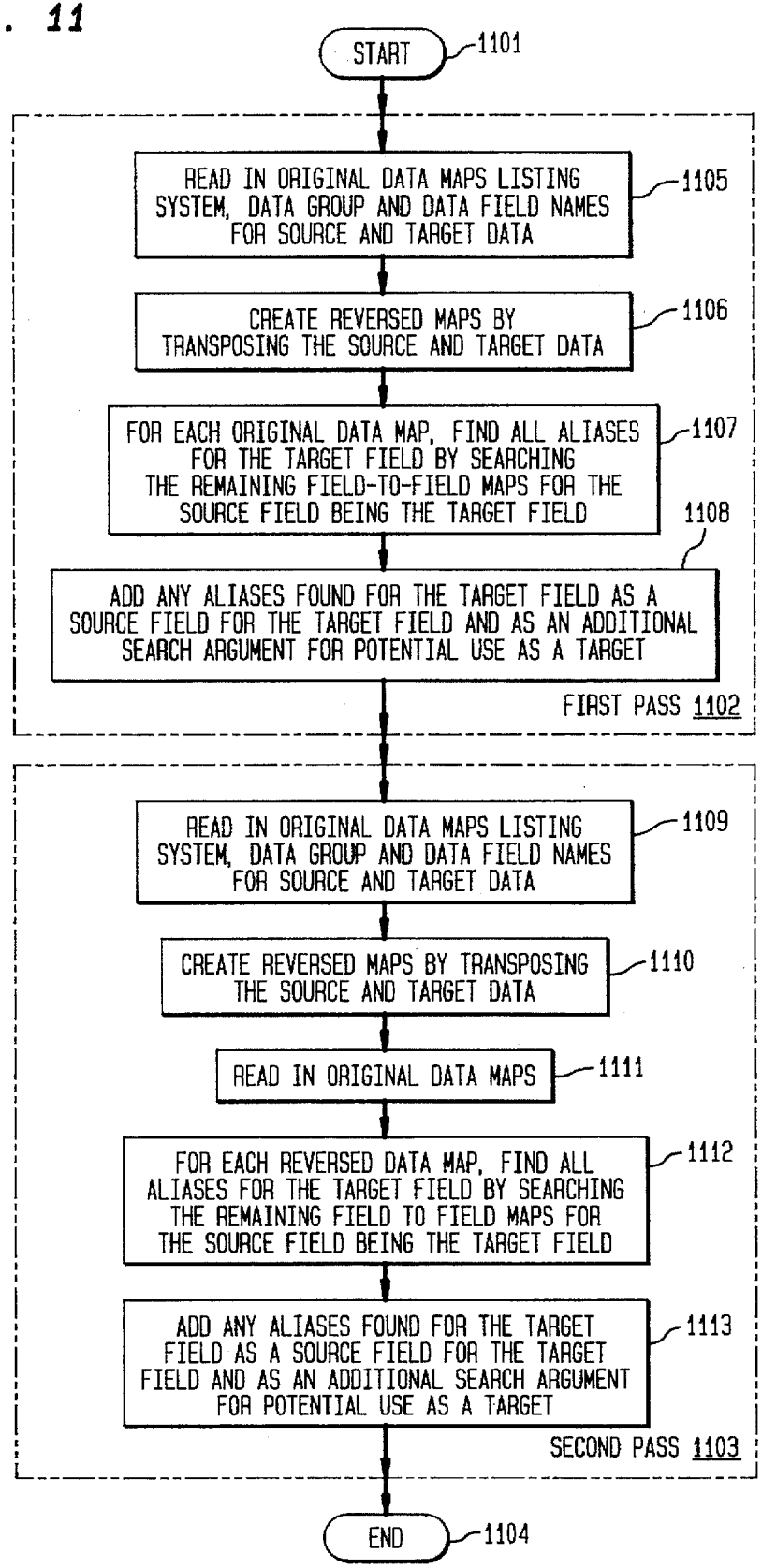
FIG. 11 shows the detailed description of the map derivation process.

The map derivation process is shown in greater detail in algorithmic form in FIG. 11. The process consists of a first pass 1102 and a second pass 1103 on two sets of transient maps. The first pass 1102 is further comprised of the steps of reading in the original data maps listing which contains the system names, the data group names and the data field names for source and target data as shown in step 1105. Next the source and the target data are transposed to create reversed maps shown in step 1106. Next, for the target field of each of the original data maps, the remaining field-to-field maps for instances where the source field is the same as the target field, whenever this search is successful in finding such a source field, the located map is termed to be an alias for the original data map, as shown in step 1107.

All such aliases are listed as a source field for the target field of the original data map and also as an additional search argument for potential use as a target, as shown in step 1108. First pass 1102 by forward chaining, generates one set of derived maps.

The second pass 1103 generates another set of derived maps based upon the reverse chaining of the map list. This is also illustrated in FIG. 11. The second pass 1003 is very similar to the steps involved in the first pass. It starts by reading in the original data map listings which detail the system names, the data group names and the data field names for both source and target data. This is shown in step 1109. Next, one creates reversed maps by transposing the source and the target data, as shown in step 1110. Thereafter, one reads in the original data maps again as shown in steps 1111. The concatenation of the reversed maps set and the original data maps produces a second set of transient maps set. Using this transient maps set as input, the map derivation tool searches for all aliases of the target field for each map of the reversed data map set. This is done by searching the remaining field-to-field maps for instances where the source field is the same as the target field for which the search is being done. This is shown in step 1112.

If the search is successful in locating any aliases for the target field of each of the reversed data maps, these aliases are added as a source field for the target field and also as additional search arguments for potential use as a target, as shown in step 1113. After the second pass, the operation of the map derivation tool ends as shown by circle 1103.

The map derivation process will be better understood by considering an illustrative example. Consider a situation where four Application Systems, CUTCHEX, APBILL, REQUEST and BILLR consist of 29 data fields organized into nine data groups as shown in Table 3 below.

TABLE 3

| DATA ORGANIZATION EXAMPLE | | |
|---|---|---|
| Application System | Data Group | Date Field |
| CUTCHEX | Account | A |
|  |  | B |
|  |  | C |
|  | Check | D |
|  |  | E |
|  |  | F |
|  |  | G |
|  | Bill | H |
|  |  | I |
|  |  | J |
| APBILL | Z7ACCT | K |
|  |  | L |
|  |  | M |
|  | Z7XMPO | N |
|  |  | O |
|  |  | P |
|  |  | Q |
|  | Z6BCDF | R |
|  |  | S |
|  |  | T |
| REQUEST | MIRQ001 | U |
|  |  | V |
|  |  | W |
|  | MIRQ002 | X |
|  |  | Y |
|  |  | Z |
| BILLR | INVOICE | AA |
|  |  | BB |
|  |  | CC |

Data maps are constructed in the first instance to link various fields together based upon their business definition. Data maps also describe any transformation that takes place when specific values of one field are copied or modified or combined before storage in another field. As already explained, stored mapping data in a system may combine prior manual mapping efforts with prior derived data maps. An illustrative mapping is detailed in Table 4 and depicted in FIG. 12.

Data Group Level and at the Data Field Level. Even though the mapping of one data field to another is usually directional, the derivation can be both in the forward direction as well as in the reverse direction. The derivation process is thus nondirectional.

System Level Derived Maps

The previous mapping example will produce the following distinct system level maps, both forward and reversed:

TABLE 4

STORED MAPPING DATA

| | From | | | → | To | | | |
|---|---|---|---|---|---|---|---|---|
| S. No. | Application System | Data Group | Data Field | | Application System | Data Group | Data Field | Algorithm | Aggregated |
| 1 | APBILL | Z6BCDF | R | → | CUTCHEX | BILL | H | Substring | Y |
| 2 | APBILL | Z6BCDF | R | → | CUTCHEX | BILL | I | Substring | Y |
| 3 | APBILL | Z6BCDF | R | → | CUTCHEX | BILL | J | Substring | Y |
| 4 | CUTCHEX | ACCOUNT | A | → | APBILL | Z7ACCT | K | Equate | N |
| 5 | CUTCHEX | ACCOUNT | B | → | APBILL | Z7ACCT | M | Equate | N |
| 6 | CUTCHEX | ACCOUNT | C | → | APBILL | Z7XMPO | N | Concatenate | N |
| 7 | CUTCHEX | CHECK | D | → | APBILL | Z7XMPO | N | Concetenate | N |
| 8 | CUTCHEX | CHECK | F | → | APBILL | Z7XMPO | O | Substring | N |
| 9 | CUTCHEX | CHECK | F | → | APBILL | Z7XMPO | P | Substring | N |
| 10 | REQUEST | MIRQ001 | U | → | APBILL | Z7ACCT | K | Equate | N |
| 11 | REQUEST | MIRQ001 | U | → | BILLR | INVOICE | BB | Equate | N |
| 12 | REQUEST | MIRQ001 | V | → | APBILL | Z7ACCT | L | Equate | N |
| 13 | REQUEST | MIRQ001 | V | → | BILLR | INVOICE | AA | Equate | N |
| 14 | REQUEST | MIRQ001 | W | → | APBILL | Z7ACCT | M | Equate | N |
| 15 | REQUEST | MIRQ002 | X | → | APBILL | Z6BCDF | R | Concatenate | Y |
| 16 | REQUEST | MIRQ002 | Y | → | APBILL | Z6BCDF | R | Concatenate | Y |
| 17 | REQUEST | MIRQ002 | Z | → | APBILL | Z6BCDF | R | Concetenate | Y |

Thus, field R of Data Group Z6BCDF of Application System APBILL is mapped to Fields H, I and G of Data Group BILL of Application System CUTCHEX using a concatenation algorithm. Data Fields A and B of Data Group ACCOUNT of Application System CUTCHEX are equated to Data Fields K and M of Data Group Z7ACCT of Application System APBILL, respectively. Data Field C of Data Group ACCOUNT and Data Field D of Data Group CHECK, both of Application System CUTCHEX, are concatenated to Data Field N of Data Group Z7XMPO of Application System APBILL. Data Field F of Data Group CHECK of Application System CUTCHEX is subdivided to Data Fields O and P of Data Group Z7XMPO of Application System APBILL. Data Fields U, V and W of Data Group MIRQ001 of Application System REQUEST are equated to Data Fields K, L and M of Data Group Z7ACCT of Application System APBILL, respectively. Data Fields U and V of Data Group MIRQ001 of Application System REQUEST are also mapped to Data Fields BB and AA of Data Group INVOICE of Application System BILLR. Finally, Data Fields X, Y and Z of Data Group MIRQ002 of Application System REQUEST are concatenated to map to Data Field R of Data Group Z6BCDF of Application System APBILL.

Starting with the stored mapping data one can derive maps at three different levels: at the System Level, at the

| First Pass | | Second Pass | |
|---|---|---|---|
| Original Section | | Reversed Section | |
| APBILL | → CUTCHEX | CUTCHEX | → APBILL |
| CUTCHEX | → APBILL | APBILL | → CUTCHEX |
| REQUEST | → APBILL | APBILL | → REQUEST |
| REQUEST | → BILLR | BILLR | → REQUEST |
| Reversed Section | | Original Section | |
| CUTCHEX | → APBILL | APBILL | → CUTCHEX |
| APBILL | → CUTCHEX | CUTCHEX | → APBILL |
| APBILL | → REQUEST | REQUEST | → APBILL |
| BILLR | → REQUEST | REQUEST | → BILLR |

Since the first pass and the second pass are very similar in structure, the forward chaining and the reverse chaining processes may be executed recursively using the same code. During the first pass, the original section of the stored map is processed and all subsequent system level maps are scanned for potential derivations.

Duplicative derivations are then removed using database return codes. In this example, the first pass would produce the following derivation:

| Derivation | | Comments |
|---|---|---|
| CUTCHEX | → REQUEST | CUTCHEX is mapped to APBILL in the original section which is mapped to REQUEST in the reversed section. |
| REQUEST | → CUTCHEX | REQUEST is mapped to APBILL in the original section which is mapped to CUTCHEX in the reversed section. |

During the second pass, the reversed section precedes the original section. For each entry in the reversed section, all subsequent system level maps are scanned for potential derivations. As before, duplicative derivations are removed using database written codes. This process results in the production of the following derivations:

| Derivation | | Comments |
|---|---|---|
| APBILL | → BILLR | APBILL is mapped to REQUEST in the reversed section which is mapped to BILLR in the original section. |
| BILLR | → APBILL | BILLR is mapped to REQUEST in the reversed section which is mapped to APBILL in the original section. |

Data Group Level Derived Maps

The data group level mapping derivations are produced using the same technique just described. From the original mapping example, the following distinct set of data group maps, forward and reversed, may be produced and is shown below:

| From | | → | To | |
|---|---|---|---|---|
| Application System | Data Group | | Application System | Data Group |
| Original | | | | |
| APBILL | Z6BCDF | → | CUTCHEX | BILL |
| CUTCHEX | ACCOUNT | → | APBILL | Z7ACCT |
| CUTCHEX | ACCOUNT | → | APBILL | Z7XMPO |
| CUTCHEX | CHECK | → | APBILL | Z7XMPO |

| From | | → | To | |
|---|---|---|---|---|
| Application System | Data Group | | Application System | Data Group |
| REQUEST | MIRQ001 | → | APBILL | Z7ACCT |
| REQUEST | MIRQ001 | → | BILLR | INVOICE |
| REQUEST | MIRQ002 | → | APBILL | Z6BCDF |
| Reversed | | | | |
| CUTCHEX | BILL | → | APBILL | Z68CDF |
| APBILL | Z7ACCT | → | CUTCHEX | ACCOUNT |
| APBILL | Z7XMPO | → | CUTCHEX | ACCOUNT |
| APBILL | Z7XMPO | → | CUTCHEX | CHECK |
| APBILL | Z7ACCT | → | REQUEST | MIRQ001 |
| BILLR | INVOICE | → | REQUEST | MIRQ001 |
| APBILL | Z6BCDF | → | REQUEST | MIRQ002 |

The two-pass map derivation process is executed to produce the following derivations:

| | From | | → | To | |
|---|---|---|---|---|---|
| Ser. No. | Application System | Data Group | | Application System | Data Group |
| 1 | APBILL | → Z7ACCT | | → BILLR | INVOICE |
| 2 | BILLR | → INVOICE | | → APBILL | Z7ACCT |
| 3 | CUTCHEX | → ACCOUNT | | → BILLR | INVOICE |
| 4 | CUTCHEX | → ACCOUNT | | → CUTCHEX | CHECK |
| 5 | CUTCHEX | → ACCOUNT | | → REQUEST | MIRQ001 |
| 6 | CUTCHEX | → BILL | | → CUTCHEX | BILL |
| 7 | CUTCHEX | → BILL | | → REQUEST | MIRQ002 |
| 8 | CUTCHEX | → CHECK | | → CUTCHEX | ACCOUNT |
| 9 | CUTCHEX | → MIRQ001 | | → CUTCHEX | ACCOUNT |
| 10 | REQUEST | → MIRQ002 | | → CUTCHEX | BILL |
| 11 | REQUEST | → MIRQ002 | | → REQUEST | MIRQ002 |

Data Field Level Derived Maps

As before, the same two-pass procedure is executed, but against all segments of the entire stored map. In this instance, unlike in the two previous higher-level derivations, the aggregation or disaggregation of various data fields must now be taken into account. The original mappings and the reversed mappings may be tabulated as shown below:

| | From | | | → | To | | | |
|---|---|---|---|---|---|---|---|---|
| S. No. | Application System | Data Group | Data Field | | Application System | Data Group | Data Field | Algorithm | Aggregated |
| 1 | APBILL | Z6BCDF | R | → | CUTCHEX | Bill | H | Substring | Y |
| 2 | APBILL | Z6BCDF | R | → | CUTCHEX | Bill | I | Substring | Y |
| 3 | APBILL | Z6BCDF | R | → | CUTCHEX | Bill | J | Substring | Y |
| 4 | CUTCHEX | ACCOUNT | A | → | APBILL | Z7ACCT | K | Equate | N |
| 5 | CUTCHEX | ACCOUNT | B | → | APBILL | Z7ACCT | M | Equate | N |
| 6 | CUTCHEX | ACCOUNT | C | → | APBILL | Z7XMPO | N | Concatenate | N |
| 7 | CUTCHEX | CHECK | D | → | APBILL | Z7XMPO | N | Concatenate | N |
| 8 | CUTCHEX | CHECK | F | → | APBILL | Z7XMPO | O | Substring | N |
| 9 | CUTCHEX | CHECK | F | → | APBILL | Z7XMPO | P | Substring | N |
| 10 | REQUEST | MIRQ001 | U | → | APBILL | Z7ACCT | K | Equate | N |
| 11 | REQUEST | MIRQ001 | U | → | BILLR | INVOICE | BB | Equate | N |
| 12 | REQUEST | MIRQ001 | V | → | APBILL | Z7ACCT | L | Equate | N |
| 13 | REQUEST | MIRQ001 | V | → | BILLR | INVOICE | AA | Equate | N |
| 14 | REQUEST | MIRQ001 | W | → | APBILL | Z7ACCT | M | Equate | N |
| 15 | REQUEST | MIRQ002 | X | → | APBILL | Z6BCDF | R | Concatenate | Y |
| 16 | REQUEST | MIRQ002 | Y | → | APBILL | Z6BCDF | R | Concatenate | Y |
| 17 | REQUEST | MIRQ002 | Z | → | APBILL | Z6BCDF | R | Concatenate | Y |
| 18 | CUTCHEX | BILL | H | → | APBILL | Z6BCDF | R | Concatenate | Y |
| 19 | CUTCHEX | BILL | I | → | APBILL | Z6BCDF | R | Concatenate | Y |

-continued

| | From | | → | To | | | | |
|---|---|---|---|---|---|---|---|---|
| S. No. | Application System | Data Group | Data Field | Application System | Data Group | Data Field | Algorithm | Aggregated |
| 20 | CUTCHEX | BILL | J | → APBILL | Z6BCDF | R | Concatenate | Y |
| 21 | APBILL | Z7ACCT | K | → CUTCHEX | ACCOUNT | A | Equate | N |
| 22 | APBILL | Z7ACCT | M | → CUTCHEX | ACCOUNT | B | Equate | N |
| 23 | APBILL | Z7XMPO | N | → CUTCHEX | ACCOUNT | C | Substring | N |
| 24 | APBILL | Z7XMPO | N | → CUTCHEX | CHECK | D | Substring | N |
| 25 | APBILL | Z7XMPO | O | → CUTCHEX | CHECK | F | Concatenate | N |
| 26 | APBILL | Z7XMPO | P | → CUTCHEX | CHECK | F | Concatenate | N |
| 27 | APBILL | Z7ACCT | K | → REQUEST | MIRQ001 | U | Equate | N |
| 28 | BILLR | INVOICE | BB | → REQUEST | MIRQ001 | U | Equate | N |
| 29 | APBILL | Z7ACCT | L | → REQUEST | MIRQ001 | V | Equate | N |
| 30 | BILLR | INVOICE | AA | → REQUEST | MIRQ001 | V | Equate | N |
| 31 | APBILL | Z7ACCT | M | → REQUEST | MIRQ001 | W | Equate | N |
| 32 | APBILL | Z6BCDF | R | → REQUEST | MIRQ002 | X | Substring | Y |
| 33 | APBILL | Z6BCDF | R | → REQUEST | MIRQ002 | Y | Substring | Y |
| 34 | APBILL | Z6BCDF | R | → REQUEST | MIRQ002 | Z | Substring | Y |

It should be noted that the above list of stored mappings comprises of both the original maps (shown as serial numbers 1 through 17) and the reversed maps (shown as serial numbers 18 through 34). As before, duplicative derivations produced during the derivation process may be eliminated using database return codes.

The following data field level maps would be derived in the above example:

| | From | | → | To | | |
|---|---|---|---|---|---|---|
| S. No. | Application System | Data Group | Data Field | Application System | Data Group | Data Field |
| 1 | APBILL | Z7ACCT | K | → BILLR | INVOICE | BB |
| 2 | APBILL | Z7ACCT | L | → BILLR | INVOICE | AA |
| 3 | BILLR | INVOICE | AA | → APBILL | Z7ACCT | L |
| 4 | BILLR | INVOICE | BB | → APBILL | Z7ACCT | K |
| 5 | CUTCHEX | ACCOUNT | A | → BILLR | INVOICE | BB |
| 6 | CUTCHEX | ACCOUNT | A | → REQUEST | MIRQ001 | U |
| 7 | CUTCHEX | ACCOUNT | B | → REQUEST | MIRQ001 | W |
| 8 | CUTCHEX | ACCOUNT | C | → CUTCHEX | CHECK | D |
| 9 | CUTCHEX | BILL | H | → CUTCHEX | BILL | I |
| 10 | CUTCHEX | BILL | H | → CUTCHEX | BILL | J |
| 11 | CUTCHEX | BILL | H | → REQUEST | MIRQ002 | X |
| 12 | CUTCHEX | BILL | H | → REQUEST | MIRQ002 | Y |
| 13 | CUTCHEX | BILL | H | → REQUEST | MIRQ002 | Z |
| 14 | CUTCHEX | BILL | I | → CUTCHEX | BILL | H |
| 15 | CUTCHEX | BILL | I | → CUTCHEX | BILL | J |
| 16 | CUTCHEX | BILL | I | → REQUEST | MIRQ002 | X |
| 17 | CUTCHEX | BILL | I | → REQUEST | MIRQ002 | Y |
| 18 | CUTCHEX | BILL | I | → REQUEST | MIRQ002 | Z |
| 19 | CUTCHEX | BILL | J | → CUTCHEX | BILL | H |
| 20 | CUTCHEX | BILL | J | → CUTCHEX | BILL | I |
| 21 | CUTCHEX | BILL | J | → REQUEST | MIRQ002 | X |
| 22 | CUTCHEX | BILL | J | → REQUEST | MIRQ002 | Y |
| 23 | CUTCHEX | BILL | J | → REQUEST | MIRQ002 | Z |
| 24 | CUTCHEX | CHECK | D | → CUTCHEX | ACCOUNT | C |
| 25 | REQUEST | MIRQ001 | U | → CUTCHEX | ACCOUNT | A |
| 26 | REQUEST | MIRQ001 | W | → CUTCHEX | ACCOUNT | B |
| 27 | REQUEST | MIRQ002 | X | → CUTCHEX | BILL | H |
| 28 | REQUEST | MIRQ002 | X | → CUTCHEX | BILL | I |
| 29 | REQUEST | MIRQ002 | X | → CUTCHEX | BILL | J |
| 30 | REQUEST | MIRQ002 | X | → REQUEST | MIRQ002 | Y |
| 31 | REQUEST | MIRQ002 | X | → REQUEST | MIRQ002 | Z |
| 32 | REQUEST | MIRQ002 | Y | → CUTCHEX | BILL | H |
| 33 | REQUEST | MIRQ002 | Y | → CUTCHEX | BILL | I |
| 34 | REQUEST | MIRQ002 | Y | → CUTCHEX | BILL | J |
| 35 | REQUEST | MIRQ002 | Y | → REQUEST | MIRQ002 | X |
| 36 | REQUEST | MIRQ002 | Y | → REQUEST | MIRQ002 | Z |
| 37 | REQUEST | MIRQ002 | Z | → CUTCHEX | BILL | H |
| 38 | REQUEST | MIRQ002 | Z | → CUTCHEX | BILL | I |
| 39 | REQUEST | MIRQ002 | Z | → CUTCHEX | BILL | J |
| 40 | REQUEST | MIRQ002 | Z | → REQUEST | MIRQ002 | X |
| 41 | REQUEST | MIRQ002 | Z | → REQUEST | MIRQ002 | Y |

Consider derived maps 8 and 24. Although the fields CUTCHEX. ACCOUNT. C and CUTCHEX. CHECK. D were concatenated to field APBILL. Z7XMPO. N, the field APBILL. Z7XMPO. N was not considered to be an aggregation by business persons because it is a field whose components are never mentioned separately. Consequently, a derivation that considers fields CUTCHEX. ACCOUNT. C and CUTCHEX. CHECK. D to be equivalent in meaning would be acceptable to a business user. Consider also derived maps 9–23 and 27–41. These derivations resulted from a linkage between fields X, Y and Z to fields H, I and J, respectively through field R. Since field R is composed of three distinct pieces of information which can be separately described and used, it is considered to be an aggregation in business usage. Consequently, the resulting derivations are not worthwhile and should be discarded.

Examples of some common mapping algorithms are shown in Table 5.

TABLE 5

COMMON PROCESSING RULES

| S. No. | Routine Name | Argument | Comments |
| --- | --- | --- | --- |
| 1 | EQ | | A straight move from the CPS field to the DRM field |
| 2 | NA | | No action required in the extract programs. This data is available from another source. |
| 3 | DATE1INC | convert from dec 7, yymmdd | Use the common date conversion routine that exists in the OSIF include data set. The name of the routine (file) is DATE1INC. This source code is included in the extract routine source with %INCLUDE. |
| 4 | DATE2INC | convert from dec 8, yymmdd | Use the common date conversion routine that exists in the OSIF include dataset. The name of the routine (file) is DATE2INC. This source code is included in the extract routine source with %INCLUDE. |
| 5 | DATE3INC | char 6, yymmdd | Use the common date conversion routine that exists in the OSIF include dataset. The name of the routine (file) is DATE3INC. This source code is included in the extract routine source with %INCLUDE. |
| 6 | DATE4INC | char 8, mm/dd/yy | Use the common date conversion routine that exists in the OSIF include dataset. The name of the routine (file) is DATE4INC. This source code is included in the extract routine source with %INCLUDE. |
| 7 | TIME1INC | fixed dec 7, hhmmss | Use the common time conversion routine that exists in the OSIF include dataset. The name of the routine (file) is TIME2INC. This source code is included in the extract routine source with %INCLUDE. |
| 8 | TIME2INC | convert from hh:mm:ss | Use the common time conversion routine that exists in the OSIF include data set. The name of the routine (file) is TIME2INC. This source code is included in the extract routine source with %INCLUDE. |
| 9 | SUBSTR | x,y | Take the substring beginning in position x for a length of y. |
| 10 | BIT1YON | | If the source field has a value of 1, then make the target field = 'Y', if the source field has a value of 0, then make the target field = 'N'. |
| 11 | BIT1YONBB | | If the source field has a value of 1, then make the target field = 'Y', if the source field has a value of 0, then make the target field = 'N', if the source field has a value of spaces or null, then make the target field = 'N'. |
| 12 | REPGRP | | This field is a repeating group on the source file. It will probably have a suffix number on the source field name. Each of these source field names will be used to create a new output record. |
| 13 | MS | X,Y | The source filed is moved into the BDW field starting at position 'x' for a length of 'y'. |
| 14 | CONSTANT | X | The data that will be moved into the BDW field is a constant value 'x'. |
| 15 | RCDEXINC | | Use the common date conversion routine that exists in the OSIF include dataset. The name of the routine (file) is RCDEXINC. |
| 16 | COND_EQ_01 | | If there is no XAE00237 records for a particular ORDER_LINE (XAE00221) then use the XAE00221 data to populate POLNACCT otherwise, use the XAE00237 data to populate POLNACCT. |

Although a preferred embodiment of the method and apparatus of the present invention has been illustrated in the accompanying drawings and described in the preceding detailed description, it is to be understood that the invention is not limited to the embodiment disclosed, but is capable of numerous rearrangements, modifications and substitutions without departing from the spirit of the invention as set forth and defined by the claims following.

What is claimed is:

1. Within a computer processing system, a method for automatically generating a data mapping from a first data format in a source database to a second data format in a target database, said method comprising the steps of:

retrieving a preexisting first data mapping from the source database to an intermediate database;

retrieving a preexisting second data mapping from the intermediate database to the target database; and automatically deriving a third data mapping from the source database to the target database based upon said first and second data mappings.

2. The method of claim 1, wherein said step of automatically deriving a third data mapping further comprises:

combining a first data translation from a first data storage format of the source database to a second data storage format of the intermediate database with a second data translation from the second data storage format to a third data storage format of the target database to automatically produce a third data translation from the first data storage format to the third data storage format.

3. The method of claim 1, further comprising the step of:

automatically moving data from the source database to the target database based upon said automatically derived third data mapping from the source database to the target database.

4. The method of claim 3, wherein said step of automatically moving data from the source database to a target database is performed by using a code generator that automatically generates computer program instructions operative to automatically move data from the source database to the target database, said code generator taking as its input said automatically derived third data mapping.

5. The method of claim 1, further comprising the step of:

automatically excluding stored data mappings whenever multiple records in a source database have been aggregated into a single record in a target database.

6. The method of claim 1, further comprising the step of:

storing said automatically derived third data mapping in the computer processing system.

7. The method of claim 6, further comprising the step of:

automatically generating a data alias table based upon the stored first and second data mappings and said automatically derived third data mapping.

8. The method of claim 7, wherein said step of automatically generating said data alias table is performed by forward chaining through a first mapping table containing all stored mappings from any source database to any target database, and reverse chaining through a second mapping table containing all stored mappings from a source database to a target database in reversed order.

9. A computer processing system for automatically generating a data mapping from a first data format in a source database to a second data format in a target database comprising:

means for retrieving a preexisting first data mapping from the source database to an intermediate database;

means for retrieving a preexisting second data mapping format from the intermediate database to the target database; and means for automatically deriving a third data mapping from the source database to the target database based upon said first and second data mappings.

10. The system of claim 9, wherein said means for automatically deriving a third data mapping further comprises:

means for combining a first data translation from a first data storage format of the source database to a second data storage format of the intermediate database with a second data translation from the second data storage format to a third data storage format of the target database to automatically produce a third data translation from the first data storage format to the third data storage format.

11. The system of claim 9, further comprising:

means for automatically moving data from the source database to the target database based upon said automatically derived third data mapping from the source database to the target database.

12. The system of claim 11, wherein said means for automatically moving data from the source database to a target database further comprises:

code generation means for automatically generating computer program instructions operative to automatically move data from the source database to the target database, said code generation means taking as its input said automatically derived third data mapping.

13. The system of claim 9, further comprising:

means for automatically excluding stored data mappings whenever multiple records in a source database have been aggregated into a single record in a target database.

14. The system of claim 9, further comprising:

means for storing said automatically derived third data mapping in the computer processing system.

15. The system of claim 14, further comprising:

means for automatically generating a data alias table based upon the stored first and second data mappings and said automatically derived third data mapping.

16. The system of claim 15, wherein said means for automatically generating said data alias table further comprises:

means for forward chaining through a first mapping table containing all stored mappings from any source database to any target database; and means for reverse chaining through a second mapping table containing all stored mappings from a source database to a target database in reversed order.

* * * * *